Figure 1:
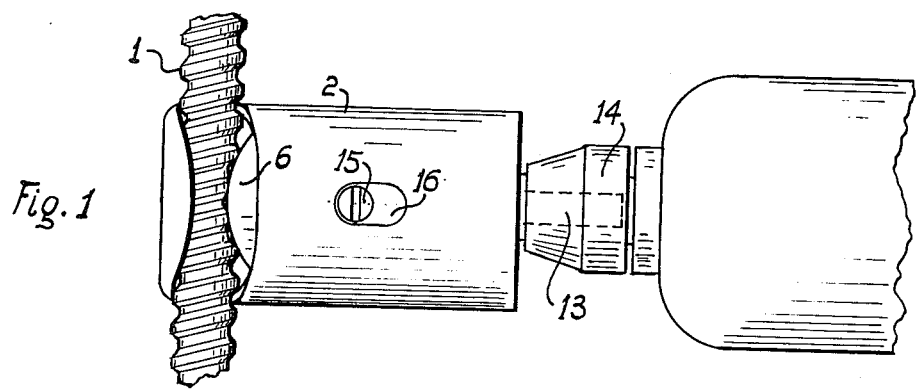

Aug. 31, 1954

Z. O. ST. PALLEY 2,687,560

CABLE ARMOR CUTTER

Filed Oct. 15, 1952

INVENTOR.

Zoltan O. St. Palley

Patented Aug. 31, 1954

2,687,560

UNITED STATES PATENT OFFICE 2,687,560

CABLE ARMOR CUTTER

Zoltan O. St. Palley, Branford, Conn.

Application October 15, 1952, Serial No. 314,830

4 Claims. (Cl. 29—67)

This invention, which is a continuation in part of my prior application, Serial Number 106,792 filed on July 26, 1949 and now abandoned, relates to an improved means for the cutting of the armor of cables formed of spirally wound strips. It is particularly applicable to electrical cables, known as BX cables.

The cutting of the BX armor is one of the most exacting and frequent operations in the art of electrical wiring, nevertheless, the overwhelming majority of the electricians use the common hack saw for this purpose, which, even in the hands of the experienced worker, may cause bodily injury to the operator and damage to the insulation of the cable. The power tools, hitherto devised, have not become popular in the art. Most of these employ small circular saws, rotated by an electric motor, for the cutting of the BX armor. Unfortunately, the circular saw has the following inherent disadvantage in this application. The circular saw, advancing toward the center of cable, has an uneven penetration. The cut is the deepest in the center and decreasing to zero at the ends, so that the length of the cut is limited by the maximum penetration of the saw. The BX cable has a thin metal armor and, in order to avoid the cutting of the insulation within the armor, it is imperative to limit the penetration of the saw to the thickness of the armor strip. The consequence of this is that the cut obtained by the saw is not sufficient to sever the armor strip.

The object of my invention is to provide a motor driven rotary cutting means which has an even penetration, making it possible to sever the armor strip of the BX cable completely without damaging the insulation within the armor.

Another object of my invention is to provide an easily replaceable and inexpensive means, for the cutting of the BX armor, in the form of a hollow-drill, the diameter of which has been made larger than the width of the armor strip, changing thereby its function from that of a drill into that of a cutting-off tool.

Another object of my invention is to provide a motor driven tool, which cuts the BX armor the right way, entirely independently of the skill and attention of the operator, and without deforming the armor, also, without the possibility of injury to the operator.

Another object of my invention is to provide an efficient and compact tool for the cutting of the BX armor, which can be conveniently attached to, and driven by, an electric portable drill, motor or other source of power.

Another object of my invention is to provide a power tool for the cutting of the BX cable armor, in which the cutting means is withdrawn, when the tool is running idle, and in which the cutting means cannot come in contact with the cable armor before the cable is securely clamped.

A further object of my invention is to provide a portable power tool for the cutting of the BX cable armor, in which the clamping of the cable and the advancing of the cutting means are accomplished by the same manual thrust, resulting in great ease and convenience in the handling of the tool.

Other objects and advantages of my invention will be apparent during the course of the following description.

Figure 2:
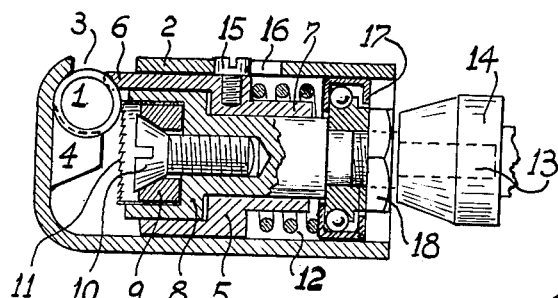
Figure 3:
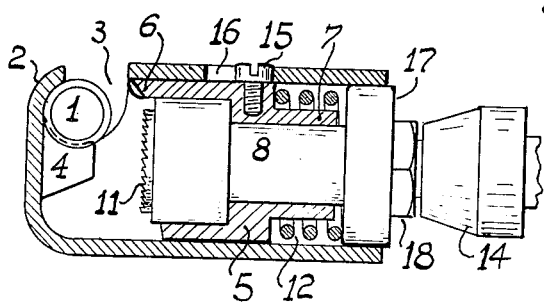
Figure 6:
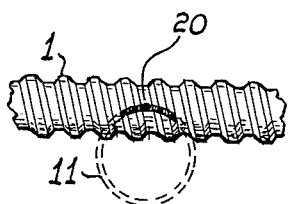
Figures 4, 5:
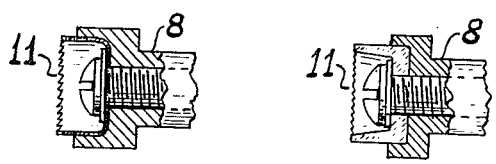

In the accompanying drawing, forming a part of this application, wherein, for the purpose of illustration, are shown a preferred embodiment and also modified forms of my invention, Figure 1 is a plan view of my cable armor cutter, Figure 2 is a vertical longitudinal section of same, with the cable clamped and in contact with the cutting means, Figure 3 is a similar section with the cutting means withdrawn and the cable unclamped, Figure 4 is a longitudinal section of a modified form of the cutting means, Figure 5 is a longitudinal section of another modified form of the cutting means, Figure 6 is a side view of the cable showing the completed cut.

Referring to the drawing, wherein like reference numerals are employed to designate like parts, the numeral 2 designates a tubular body portion, having a cavity 3 for receiving an armored cable 1. Rib shaped portion 4 of said cavity projects into the spiral groove of said armored cable for positioning the cable axially.

Slidably mounted within said body portion 2, is sleeve 5 which carries, at one end, the clamping wedge 6, so disposed, that when the sleeve is advanced, the wedge exerts a pressure on the cable 1, securely clamping it in the cavity 3. The clamping wedge 6 is provided with teeth projecting into the spiral groove of the cable to obtain a more secure clamping and positioning of the cable. At the other end, sleeve 5 has a hub 7 connected by a shoulder. The sleeve is provided with a set-screw 15, sliding in slot 16, for limiting its axial shift in the body portion 2.

Rotatably and slidably mounted within the sleeve 5, is a mandrel 8 which, at one end, carries the cutting means 11 consisting of a hollow-drill, secured to the mandrel by means of a split washer 9 and a retaining screw 10.

Secured to mandrel 8, by nut 18, is a thrust bearing 17, preferably of the ball-bearing type, being slidable in the body portion 2. Adjacent to nut 18, the mandrel is provided with a drive end 13 adapted to engage the driving connection 14, such as the chuck of a portable electric drill, motor, or other source of power.

Interposed between the sleeve 5 and bearing 17, is spring 12, the purpose of which is two-fold. In the cutting position of the tool (see Fig. 2), the spring 12 transmits to the wedge 6 the axial force necessary for the clamping of the cable. In the idle position (see Fig. 3), said spring withdraws the hollow-drill 11 into the sleeve, as a protection against injury to the operator or damage to the cutting means.

The advantage of the hollow-drill toward the cable is accomplished by manual thrust applied axially to the mandrel. In the first stage of this advance, the clamping wedge 6 and the hollow-drill 11 advance together, due to the interposed spring 12. After the clamping wedge has engaged the cable, only the hollow-drill can advance further by compressing the spring 12. This compression of the spring increases the pressure of the clamping wedge on the cable, so that when the hollow-drill reaches the exterior surface of the cable armor, the cable is securely clamped and axially positioned in the cavity 3. Then, due to the continued axial thrust on the mandrel, the rotated hollow-drill will continue the advance by penetrating into the armor, until the axial clearance between the hub 7 and the bearing 17 is reduced to zero. Thus, hub 7 acts as a mechanical stop to limit the penetration of the hollow-drill into the cable armor. By inserting thin washers between said hub and thrust bearing the penetration of the hollow-drill can be very finely regulated. This hub 7 also serves the purpose of preventing a contact between the hollow-drill and the cable in case, due to some defect, the spring 12 has failed to advance the wedge 6 sufficiently to effect a secure clamping of the cable.

As an additional safety feature, for limiting the depth of the cut in the cable armor, the preferred form of hollow-drill 11 is deeply recessed into the end of the mandrel 8 (see Figs. 2 and 3), so that the maximum depth of the cut is also limited by the projection of the hollow-drill beyond the end of the mandrel.

In the preferred form of my invention the cutting means consists of an annular hollow-drill, made of a short saw blade bent in a circle, with the ends not attached. Figs. 4 and 5 show alternative forms of the hollow-drill, made of metal and abrasive material, respectively. It is within the spirit of my invention to use closed annular, cylindrical, conical, cup-shaped, or any other type of hollow-drills or hole-saws, made of any suitable material, provided they are of sufficiently large diameter to produce a cut across the full width of the armor strip.

The preferred disposition of the hollow-drill, with respect to the cable, is shown in Fig. 6 of the drawing, in which hollow-drill 11 is arranged tangentially to a plane passing through the center line of cable, and in which the point 20 of the cut nearest to the center line of the cable, will approximately coincide with the innermost point of the armor strip. It is within the spirit of my invention to use the hollow-drill in other relative position with respect to the cable, provided, the hollow-drill, when advanced axially, can produce a cut across the full width of the armor strip without cutting the insulation within the armor.

The method of operation will be as follows:

The drive end 13 is secured in the chuck 14 of a portable electric drill and the drill is started. The cable 1 is placed into the cavity 3. Then, placing the end of the tool against a solid object, the portable drill is pushed forward until the limit of the axial motion is reached. Following this, the thrust on the portable drill is relieved and the cable, with the completed cut, removed.

Alternatively, the drive end 13 of the tool may be secured to the drive shaft of a stationary motor, and the axial thrust may be applied manually at the end of the tool adjacent to the cavity 3.

It is to be understood that the form of my invention, herewith shown and described, is to be taken as a preferred example of same, and that various changes in the shape, size and arrangement of parts may be resorted to, without departing from the spirit of my invention, or the scope of the subjoined claims.

I claim:

1. A tool for cutting the spirally wound armor strip of cables, comprising, a clamping device for holding a cable, carrying said armor strip; a hollow-drill, of larger diameter than the width of said armor strip, rotatably and axially slidably mounted on said clamping device, and disposed to produce a cut across the width of said armor strip; driving means for connecting said hollow-drill with the drive shaft of an electric motor; manual means for applying axial pressure on said hollow-drill; adjustable mechanical stop for limiting the axial shift of said hollow-drill, in order to limit its penetration into said armor strip.

2. A tool for cutting the spirally wound armor strip of a cable, comprising, a clamping device adapted for holding and positioning said cable, carrying said armor strip; a hollow-drill of larger diameter than the width of said armor strip, rotatably and axially slidably mounted on said clamping device, and disposed to produce a cut across the width of said armor strip, said hollow-drill being adapted to actuate said clamping device so that the axial shift of said hollow-drill toward said cable will effect the closing of said clamping device; driving means for connecting said hollow-drill to the drive shaft of an electric motor; manual means for the axial shifting of said hollow-drill.

3. A tool for cutting the spirally wound armor strip of a cable, comprising, a tubular body portion having a cavity adapted to hold and axially position said cable; a clamping wedge, slidably mounted within said body portion, and adapted to engage and secure said cable in said cavity when said wedge is advanced; a rotatably and axially slidably mounted hollow-drill, of larger diameter than the width of said armor strip, being disposed to produce a cut across the width of said armor strip; mechanical actuating means interposed between said clamping wedge and said hollow-drill, whereby the advancing of the hollow-drill toward the cable will actuate the wedge to engage and secure the cable in the cavity; driving means for connecting said hollow-drill to the drive shaft of an electric motor; manual means for the axial shifting of said hollow-drill.

4. The tool of claim 3 in which said mechanical actuating means is resilient and said driving means consists of the chuck of a portable drill.

References Cited in the file of this patent

UNITED STATES PATENTS

| Number | Name | Date |
| --- | --- | --- |
| 1,451,610 | Gestas | Apr. 10, 1923 |
| 2,176,646 | Thatcher | Oct. 17, 1939 |
| 2,573,991 | Schmildknecht | Nov. 6, 1951 |